(12) United States Patent
Tsunoya (10) Patent No.: US 11,305,481 B2
(45) Date of Patent: Apr. 19, 2022

(54) MANUFACTURING METHOD OF THREE-DIMENSIONAL OBJECT

(71) Applicant: Seiko Epson Corporation, Tokyo (JP)

(72) Inventor: Akihiko Tsunoya, Okaya (JP)

(73) Assignee: Seiko Epson Corporation

( * ) Notice: Subject to any disclaimer, the term of this patent is extended or adjusted under 35 U.S.C. 154(b) by 192 days.

(21) Appl. No.: 16/600,597

(22) Filed: Oct. 14, 2019

(65) Prior Publication Data

US 2020/0114571 A1  Apr. 16, 2020

(30) Foreign Application Priority Data

Oct. 15, 2018 (JP) .............................. JP2018-194487

(51) Int. Cl.
| | |
|---|---|
| *B29C 64/118* | (2017.01) |
| *B33Y 10/00* | (2015.01) |
| *B29C 64/20* | (2017.01) |
| *B33Y 30/00* | (2015.01) |

(52) U.S. Cl.
CPC ............ *B29C 64/118* (2017.08); *B29C 64/20* (2017.08); *B33Y 10/00* (2014.12); *B33Y 30/00* (2014.12)

(58) Field of Classification Search
CPC ..................................................... B33Y 10/00
See application file for complete search history.

(56) References Cited

U.S. PATENT DOCUMENTS

| | | | | |
|---|---|---|---|---|
| 6,423,255 B1* | 7/2002 | Hoechsmann | ......... | B33Y 70/00 264/113 |
| 2002/0195747 A1* | 12/2002 | Hull | ....................... | B29C 64/124 264/401 |
| 2005/0131570 A1* | 6/2005 | Jamalabad | ................ | B28B 3/10 700/119 |
| 2014/0070461 A1* | 3/2014 | Pax | ....................... | B29C 64/393 264/401 |
| 2015/0258706 A1* | 9/2015 | Okamoto | ............... | B29C 64/165 428/413 |
| 2015/0266235 A1* | 9/2015 | Page | ...................... | B29C 64/106 264/245 |
| 2016/0001504 A1* | 1/2016 | Ikeda | ................... | B29C 67/0059 264/255 |
| 2017/0225445 A1* | 8/2017 | Gardiner | ................ | B29C 64/106 |
| 2017/0232674 A1* | 8/2017 | Mark | ...................... | B33Y 30/00 264/308 |
| 2018/0311891 A1* | 11/2018 | Duty | ...................... | B29C 64/118 |

FOREIGN PATENT DOCUMENTS

JP         2017-523068 A      8/2017

* cited by examiner

*Primary Examiner* — Cachet I Proctor
(74) *Attorney, Agent, or Firm* — Harness, Dickey & Pierce, P.L.C.

(57) ABSTRACT

Provided is a manufacturing method of a three-dimensional object for manufacturing a three-dimensional object by laminating unit layers using a fluid constituent material. The manufacturing method includes a unit layer formation step of forming the unit layer of one layer by forming a first unit layer in which first layers each having a first thickness are laminated and then forming a second unit layer formed of a second layer having a second thickness greater than the first thickness to adjoin the first unit layer. By executing such a manufacturing method of the three-dimensional object, it is possible to manufacture a highly dense three-dimensional object in a short time.

7 Claims, 9 Drawing Sheets

MANUFACTURING METHOD OF THREE-DIMENSIONAL OBJECT

The present application is based on, and claims priority from, JP Application Serial Number 2018-194487, filed Oct. 15, 2018, the disclosure of which is hereby incorporated by reference herein in its entirety.

BACKGROUND

1. Technical Field

The present disclosure relates to a manufacturing method of a three-dimensional object.

2. Related Art

In the related art, various manufacturing methods of a three-dimensional object are used. Among them, there is a manufacturing method of a three-dimensional object for manufacturing a three-dimensional object by laminating layers using a fluid constituent material. For example, JP-T-2017-523068 discloses a manufacturing method of a three-dimensional object for manufacturing a three-dimensional object by forming beads as a layer by accumulating a fluid constituent materials using a plurality of nozzles and laminating the beads.

In a manufacturing method of a three-dimensional object in the related art for manufacturing a three-dimensional object by laminating layers using a fluid constituent material, since a force acts on the fluid constituent material such that a cross sectional shape becomes round by surface tension, the fluid constituent material ejected from an ejector is disposed in a state in which the cross section is close to a circle or an ellipse in some cases. The shape of the cross section is affected by thickness per layer, and the ejected fluid constituent material approaches a square as the thickness per layer is reduced. If the layer is formed with increased thickness per layer of the fluid constituent material, and thus, the fluid constituent material is disposed in a state of being close to a circle or an ellipse, a gap is generated in an adjoining disposition portion of the fluid constituent material in some cases. If the gap is generated in the adjoining disposition portion of the fluid constituent material, the density of the three-dimensional object declines. Further, if the thickness per layer of the fluid constituent material is reduced to form a layer, of course, manufacturing time of the three-dimensional object is lengthened.

In the manufacturing method of the three-dimensional object disclosed in the JP-T-2017-523068, by using a plurality of nozzles to make flow rates of the constituent material from the respective nozzles different, it is possible to simultaneously form portions having different thicknesses in one layer of beads. However, the configuration fails to suppress the generation of the gap in the adjoining disposition portion of the fluid constituent material.

SUMMARY

A manufacturing method according to an aspect of the present disclosure is a manufacturing method of a three-dimensional object for manufacturing a three-dimensional object by laminating unit layers using a fluid constituent material. The manufacturing method includes a unit layer formation step of forming the unit layer by forming a first unit layer in which first layers each having a first thickness are laminated and then forming a second unit layer formed of a second layer having a second thickness greater than the first thickness to adjoin the first unit layer, in which the unit layer formation step is executed a plurality of times to laminate the unit layer.

DESCRIPTION OF EXEMPLARY EMBODIMENTS

First, the present disclosure will be schematically described.

A manufacturing method of a three-dimensional object according to a first aspect of the present disclosure for solving the problem described above is a manufacturing method of the three-dimensional object for manufacturing a three-dimensional object by laminating unit layers using a fluid constituent material. The manufacturing method includes a unit layer formation step of forming the unit layer by forming a first unit layer in which first layers each having a first thickness are laminated and then forming a second unit layer formed of a second layer having a second thickness greater than the first thickness to adjoin the first unit layer, in which the unit layer formation step is executed a plurality of times to laminate the unit layer.

According to the present aspect, the unit layer is formed by the formation of the first unit layer in which the first layers are laminated and then the second unit layer, formed of the second layer having the second thickness greater than the first thickness, to adjoin the first unit layer is formed. Due to the lamination of the first layers, irregularities are formed in contact portions with the second unit layer in the first unit layer, and the contactability of the contact portions with the constituent material of the second unit layer improves. Therefore, by causing the first unit layer formed of a plurality of thin layers to adjoin the thick second unit layer, it is possible to suppress a gap that can be generated by adjoining with a thick layer and to shorten the manufacturing time of the three-dimensional object as compared with a case in which the unit layer is formed of thin layers only.

In the manufacturing method of the three-dimensional object according to a second aspect of the present disclosure, in the first aspect, a unit layer is formed by ejection of the constituent material of the first unit layer and the constituent material of the second unit layer from the same ejector in the unit layer formation step.

According to the present aspect, since a unit layer is formed by the ejection of the constituent material of the first unit layer and the constituent material of the second unit layer from the same ejector, a plurality of ejectors are not required and it is possible to manufacture the three-dimensional object by an inexpensive manufacturing apparatus of the three-dimensional object having a simple configuration.

In the method of manufacturing a three-dimensional object according to a third aspect of the present disclosure, in the first or second aspect, in the unit layer formation step, the first unit layer is disposed in a portion constituting a surface of the three-dimensional object.

According to the present aspect, since the first unit layer is disposed in a portion constituting the surface of the three-dimensional object, it is possible to closely form the surface of the three-dimensional object and to raise the density of the three-dimensional object.

In the manufacturing method of the three-dimensional object according to a fourth aspect of the present disclosure, in any one of the first to third aspects, in the unit layer formation step, the viscosity of the constituent material of the first unit layer at the time of the first unit layer formation is higher than the viscosity of the constituent material of the second unit layer at the time of the second unit layer formation.

According to the present aspect, the viscosity of the constituent material of the first unit layer at the time of the first unit layer formation is higher than the viscosity of the constituent material of the second unit layer at the time of the second unit layer formation. That is, by disposing the constituent material of the second unit layer having low viscosity and good contactability to adjoin the first unit layer, it is possible to effectively suppress the generation of a gap in the contact portion of the first unit layer and the second unit layer.

In the manufacturing method of the three-dimensional object according to a fifth aspect of the present disclosure, in the fourth aspect, the unit layer is formed by the ejection of the constituent material of the first unit layer and the constituent material of the second unit layer from the ejector in the unit layer formation step, and the ejection temperature of the constituent material of the first unit layer at the time the first unit layer formation is higher than the ejection temperature of the constituent material of the second unit layer at the time of the second unit layer formation in the unit layer formation step.

It is possible to lower the viscosity by raising the ejection temperature. According to the present aspect, the ejection temperature of the constituent material of the first unit layer at the time of the first unit layer formation is higher than the ejection temperature of the constituent material of the second unit layer at the time of the second unit layer formation. Therefore, for example, it is possible to effectively suppress the generation of a gap in the adjoining portion of the first unit layer and the second unit layer while making the constituent material of the first unit layer and the constituent material of the second unit layer the same.

In the manufacturing method of the three-dimensional object according to a sixth aspect of the present disclosure, in the fourth aspect, the constituent material of the first unit layer and the constituent material of the second unit layer are different from each other.

According to the present aspect, the constituent material of the first unit layer and the constituent material of the second unit layer are different from each other. That is, it is possible to make the viscosity of the constituent material of the second unit layer lower than the viscosity of the constituent material of the first unit layer. Therefore, it is possible to effectively suppress the generation of a gap in the adjoining portion of the first unit layer and the second unit layer by using a manufacturing apparatus of the three-dimensional object having a simple configuration in which the ejection temperature of the constituent material of the first unit layer and the ejection temperature of the constituent material of the second unit layer cannot be changed, for example.

In the manufacturing method of the three-dimensional object according to a seventh aspect of the present disclosure, in any one of the first to sixth aspects, the first unit layer and the second unit layer are alternately arranged in the lamination direction in which the unit layers are laminated in the unit layer formation step.

According to the present aspect, the first unit layer and the second unit layer are alternately arranged in the lamination direction in which the unit layers are laminated. Therefore, it is possible to manufacture the three-dimensional object without bias in composition.

In the following, embodiments according to the present disclosure will be described with reference to attached drawings.

First, an overview of a manufacturing apparatus 1 of the three-dimensional object according to an aspect of the present disclosure will be described with reference to FIGS. 1 to 4.

Here, the X-direction in the drawings is a horizontal direction, the Y-direction is a horizontal direction orthogonal to the X-direction, and the Z-direction is the vertical direction.

"Three-dimensional modeling" in the present specification indicates the formation of a so-called three-dimensional object and also includes the formation of even a so-called two dimensional shape having a thickness such as a flat plate shape configured with a layer of one layer. Further, to "support" means not only supporting from the lower side but also supporting from the lateral side and, in some cases, supporting from the upper side.

Figure 1:
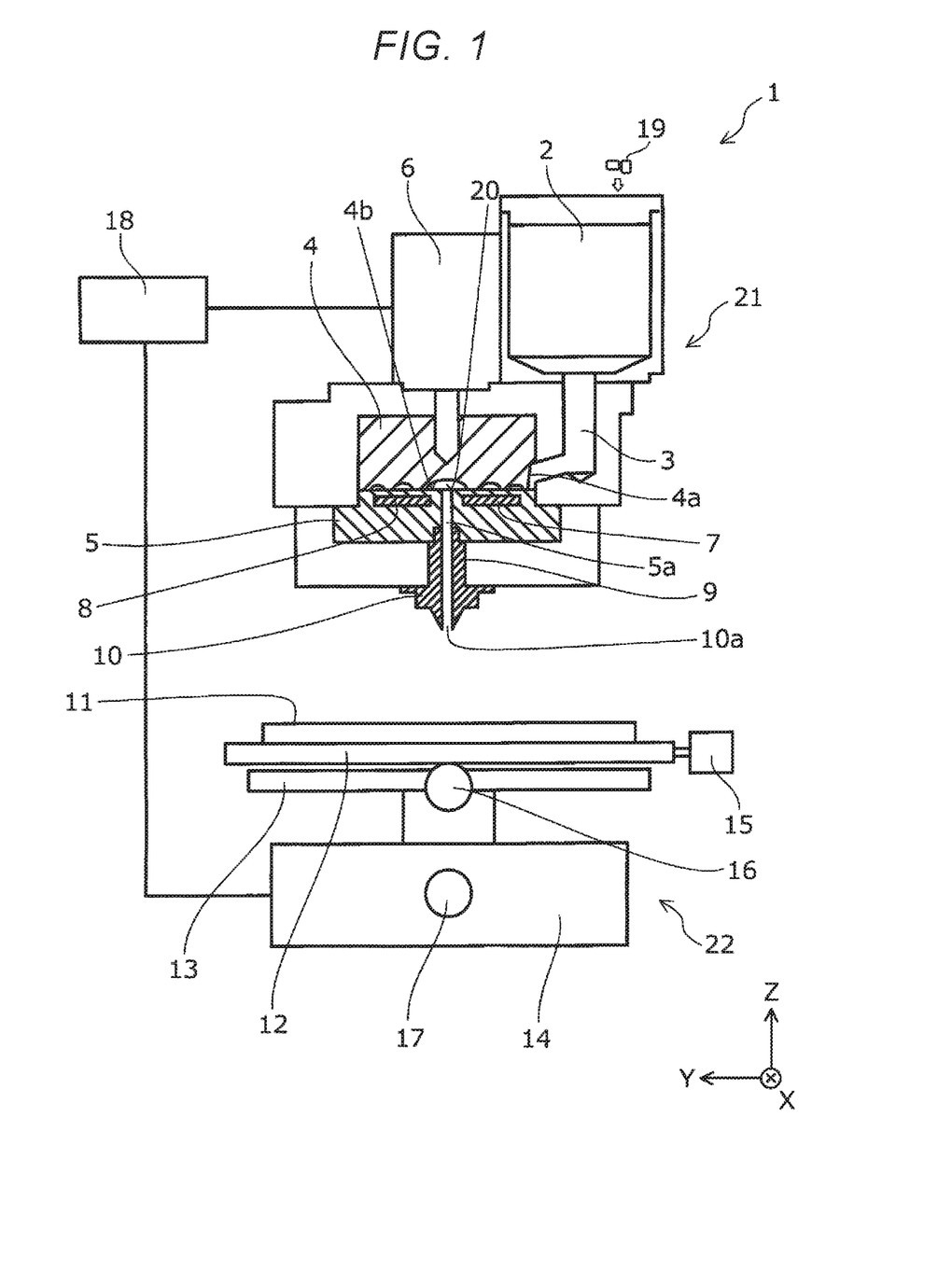
FIG. 1 is a schematic configuration view showing a configuration of a manufacturing apparatus of a three-dimensional object according to an embodiment of the present disclosure.

As shown in FIG. 1, the manufacturing apparatus 1 of the three-dimensional object according to the present embodiment includes a hopper 2 accommodating a pellet 19 as the constituent material constituting the three-dimensional object. The pellet 19 accommodated in the hopper 2 is supplied to a circumference surface 4a of a substantially cylindrical flat screw 4 through a supply tube 3. The constituent material used in the manufacturing apparatus 1 of the three-dimensional object according to the present embodiment contains a binder made of metal powder and resin. However, the type of constituent material used is not particularly limited as long as it can be made to have fluidity.

Figure 2:
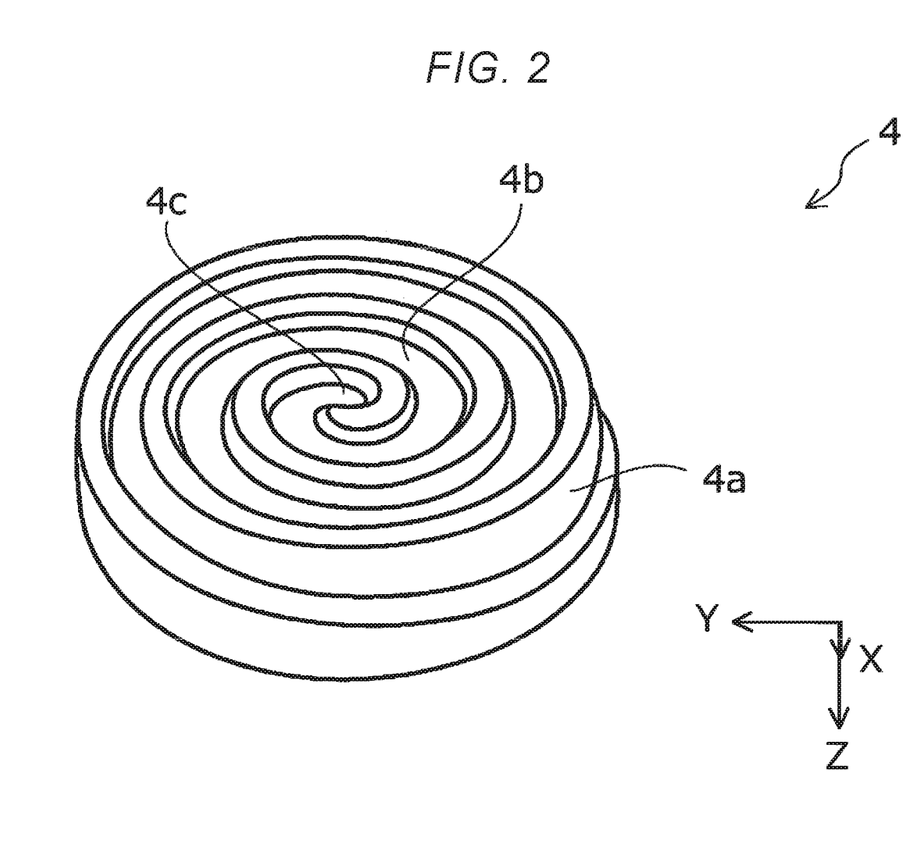
FIG. 2 is a schematic view showing a flat screw of the manufacturing apparatus of the three-dimensional object according to an embodiment of the present disclosure.
Figure 3:
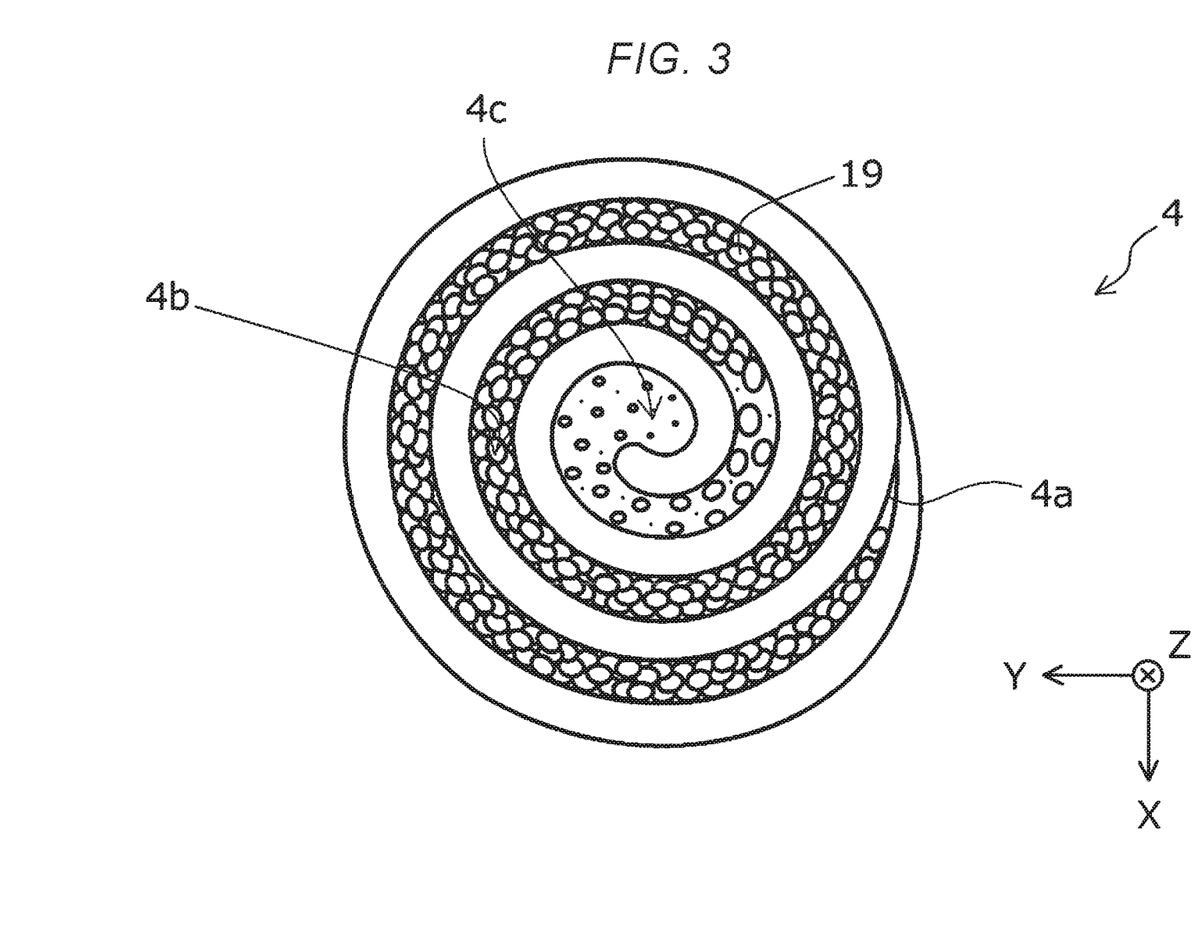
FIG. 3 is a schematic view showing a state in which the flat screw of the manufacturing apparatus of the three-dimensional object is filled with a constituent material according to an embodiment of the present disclosure.

As shown in FIG. 2, a spiral notch 4b extending from the circumference surface 4a to a center portion 4c is formed on a bottom surface of the flat screw 4. Therefore, as shown in FIG. 3, the pellet 19 is fed from the circumference surface 4a to the center portion 4c as the flat screw 4 is rotated by a motor 6 shown in FIG. 1, with the Z-direction serving as a rotation axis.

As shown in FIG. 1, a barrel 5 is provided at a predetermined interval at a position facing the bottom surface of the flat screw 4. Heaters 7 and 8 are provided in the vicinity of an upper surface of the barrel 5. With the flat screw 4 and the barrel 5 configured as described above, by the rotation of the flat screw 4, the pellet 19 is supplied to the space portion 20 by the notch 4b, which is formed between the bottom surface of the flat screw 4 and the upper surface of the barrel 5, and moves from the circumference surface 4a to the center portion 4c. When the pellet 19 moves in the space portion 20 by the notch 4b, the pellet 19 melts by the heat of the heaters 7 and 8 to be plasticized and, further, is pressurized as the pellet 19 moves in the narrow space portion 20. Thus, the fluid constituent material is ejected from a nozzle 10a as the pellet 19 is plasticized. In the present specification, "fluid constituent material" means to include not only the material having fluidity at room temperature but also the material which is solid at room temperature and can be turned into a fluid state by heating like the pellet 19. Further, even if all of the plurality of raw materials constituting the pellet 19 do not melt, some raw materials may melt to have fluidity. Specifically, a pellet material in which a metal particle material, a thermoplastic resin, and a wax are kneaded may be used.

Example of Metal Particle Material

A single metal of magnesium (Mg), iron (Fe), cobalt (Co), chromium (Cr), aluminum (Al), titanium (Ti), copper (Cu), and nickel (Ni) or an alloy containing two or more of these metals. Maraging steel, stainless steel, cobalt chromium molybdenum steel, titanium alloy, nickel alloy, aluminum alloy, cobalt alloy, and cobalt chromium alloy.

Example of Thermoplastic Material

Polypropylene resin (PP), polyethylene resin (PE), and polyacetal resin (POM).

Figure 4:
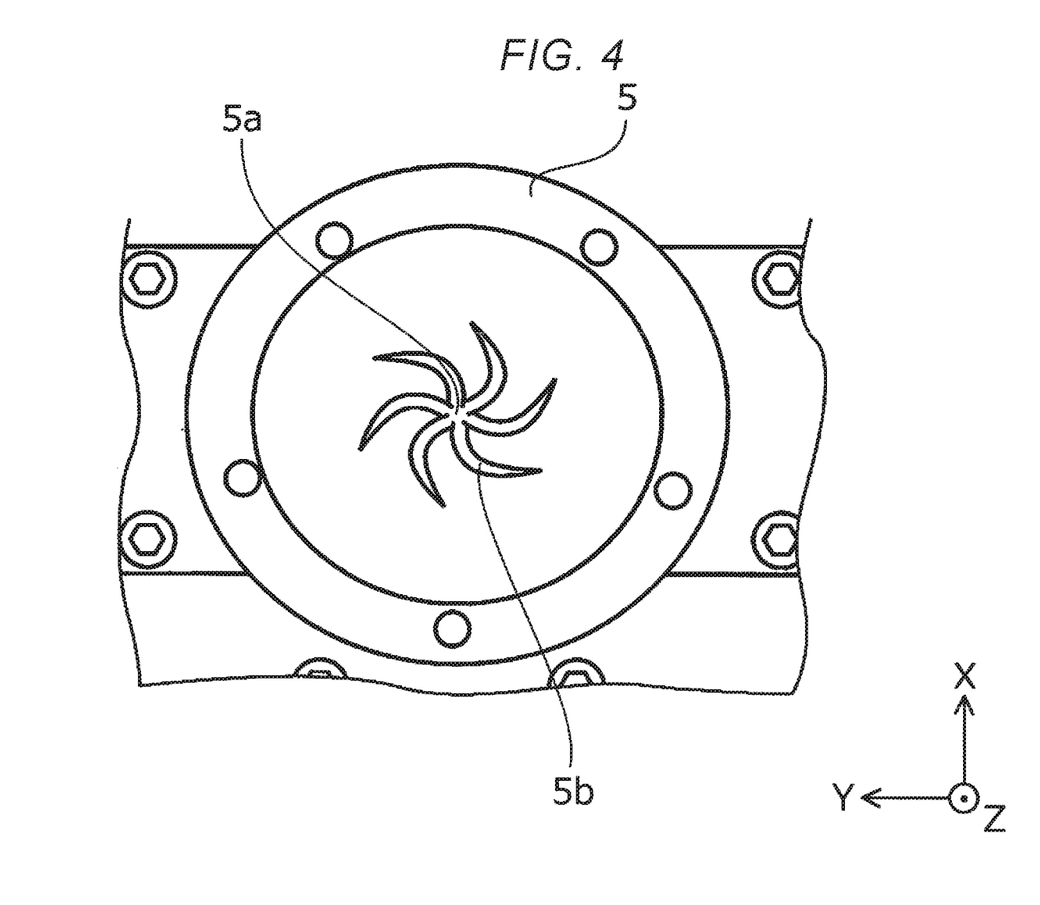
FIG. 4 is a schematic view showing a barrel of the manufacturing device of the three-dimensional object according to an embodiment of the present disclosure.

As shown in FIGS. 1 and 4, a moving path 5a of the constituent material which is the molten pellet 19 is formed in the center portion of the barrel 5 in plan view. As shown in FIG. 1, the moving path 5a is connected to the nozzle 10a of the ejector 10 ejecting the constituent material. As shown in FIG. 4, a plurality of grooves 5b which are connected to the moving path 5a are formed on the upper surface of the barrel 5 and the constituent material is easily gathered toward the moving path 5a.

The ejector 10 is configured to continuously eject the constituent material in a fluid state from the nozzle 10a. As shown in FIG. 1, the ejector 10 is provided with a heater 9 for making the constituent material have the desired viscosity. The constituent material ejected from the ejector 10 is linearly ejected. Then, a unit layer which is a layer of the constituent material is formed by the linear ejection of the constituent material from the ejector 10. The unit layer U that can be formed by the manufacturing apparatus 1 of the three-dimensional object according to the present embodiment includes a first unit layer U1 in which a plurality of first layers 23 having a first thickness L1 are laminated and a second unit layer U2 formed of a second layer 24 of one layer having a second thickness L2 greater than the first thickness L1. The details will be described below with reference to FIGS. 5 to 9.

In the manufacturing apparatus 1 of the three-dimensional object according to the present embodiment, the hopper 2, the supply tube 3, the flat screw 4, the barrel 5, the motor 6, the ejector 10, and the like form an ejection unit 21. The manufacturing apparatus 1 of the three-dimensional object according to the present embodiment is configured to include one ejection unit 21 ejecting the constituent material and may be configured to include a plurality of ejection units 21 ejecting the constituent material or may be configured to include an ejection unit 21 ejecting a support material. Here, the support material is a material for forming a unit layer of support material for supporting the unit layer U of the constituent material.

Further, as shown in FIG. 1, the manufacturing apparatus 1 of the three-dimensional object according to the present embodiment includes a stage unit 22 for placing the unit layer U formed by the ejection from the ejection unit 21. The stage unit 22 includes a plate 11 on which the unit layer U is actually placed. Further, the stage unit 22 includes a first stage 12 on which the plate 11 is placed and which is configured to change positions in the Y-direction by the driving of a first driver 15. Further, the stage unit 22 includes a second stage 13 on which the first stage 12 is placed and which is configured to change positions in the X-direction by the driving of a second driver 16. The stage unit 22 includes a base portion 14 configured to change positions of the second stage 13 in the Z-direction by the driving of a third driver 17.

As shown in FIG. 1, the manufacturing apparatus 1 of the three-dimensional object according to the present embodiment is electrically coupled to a control unit 18 controlling various driving of the ejection unit 21 and various driving of the stage unit 22.

Next, the manufacturing method of the three-dimensional object executed with the manufacturing apparatus 1 of the three-dimensional object according to the present embodiment will be described with reference to a flowchart of FIG. 5 along with unit layer U formation diagrams of FIGS. 6 to 9.

Figure 5:
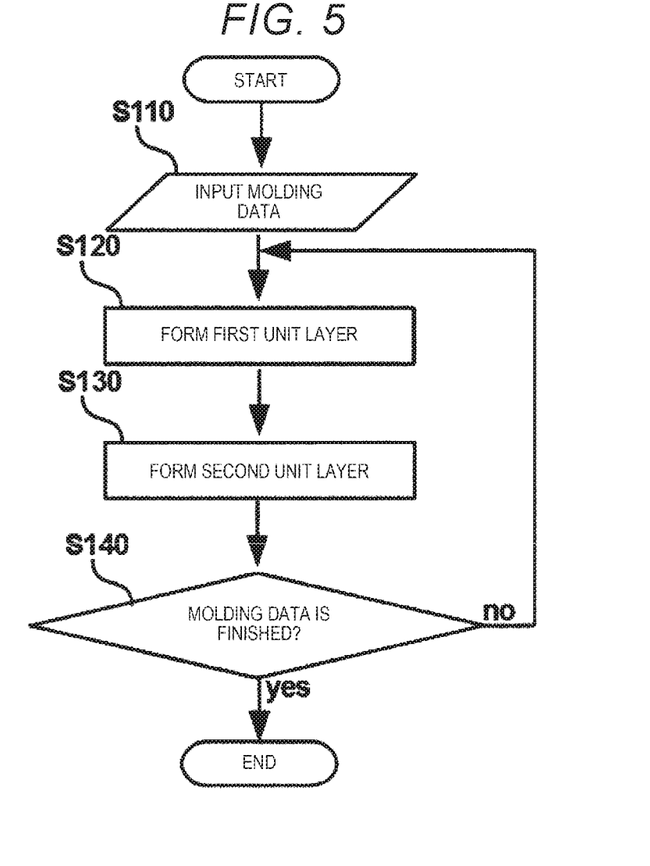
FIG. 5 is a flowchart of the manufacturing method of the three-dimensional object according to an embodiment of the present disclosure.

In the manufacturing method of the three-dimensional object of the present embodiment example, first, molding data of the three-dimensional object to be manufactured is input in the step S110 as shown by the flowchart of FIG. 5. There is no particular limit to the input source of the molding data of the three-dimensional object and it is possible to input the molding data into the manufacturing apparatus 1 of the three-dimensional object by using a PC or the like.

Figure 6:
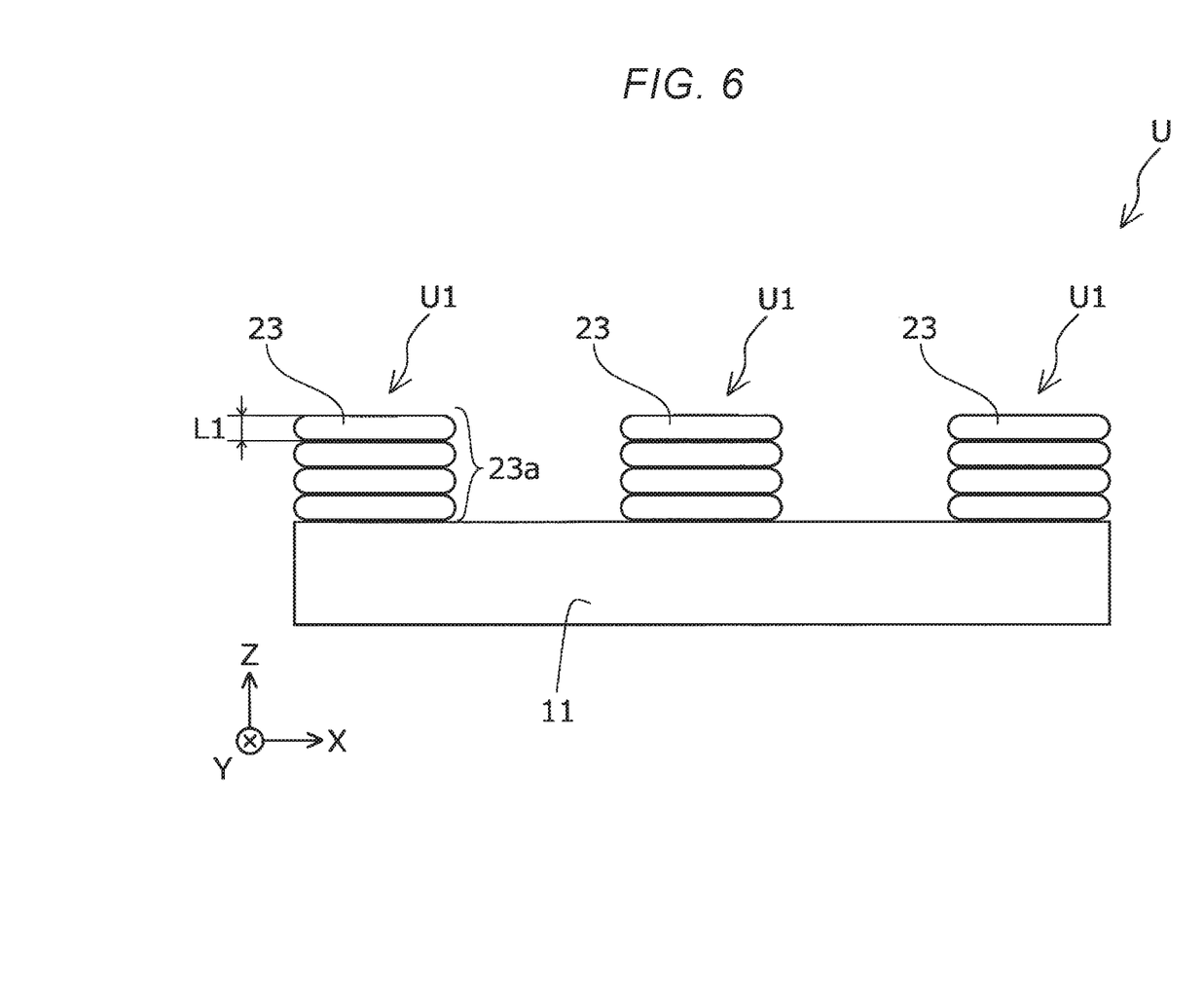
FIG. 6 is a schematic view for describing a state of a unit layer before formation of a second unit layer after formation of a first unit layer in the manufacturing method of the three-dimensional object according to an embodiment of the present disclosure.

Next, based on the molding data input in the step S110, the first unit layer U1 in which a plurality of the first layers 23 having the first thickness L1 are laminated is formed in the step S120. FIG. 6 shows a state in which the first unit layer U1 is formed by the present step S120. In the present embodiment, the first unit layer U1 is formed of the first layer 23 of four layers, and there is no particular limit to the number of laminated layers of the first layer 23 in the first unit layer U1.

Here, as shown in FIG. 6, a force acts on the fluid constituent material such that the surface area is reduced by surface tension, that is, the sectional shape is rounded. Therefore, the overall roundness of the first layer 23 is alleviated by the thinning of the layer although the first layer 23 is more or less rounded as a whole. However, end portions of the respective first layers 23 are more or less rounded. Then, since the end portions of the respective first layers 23 are more or less rounded, the contact portions 23a with the second unit layer U2 in the first unit layer U1 are irregular.

Figure 7:
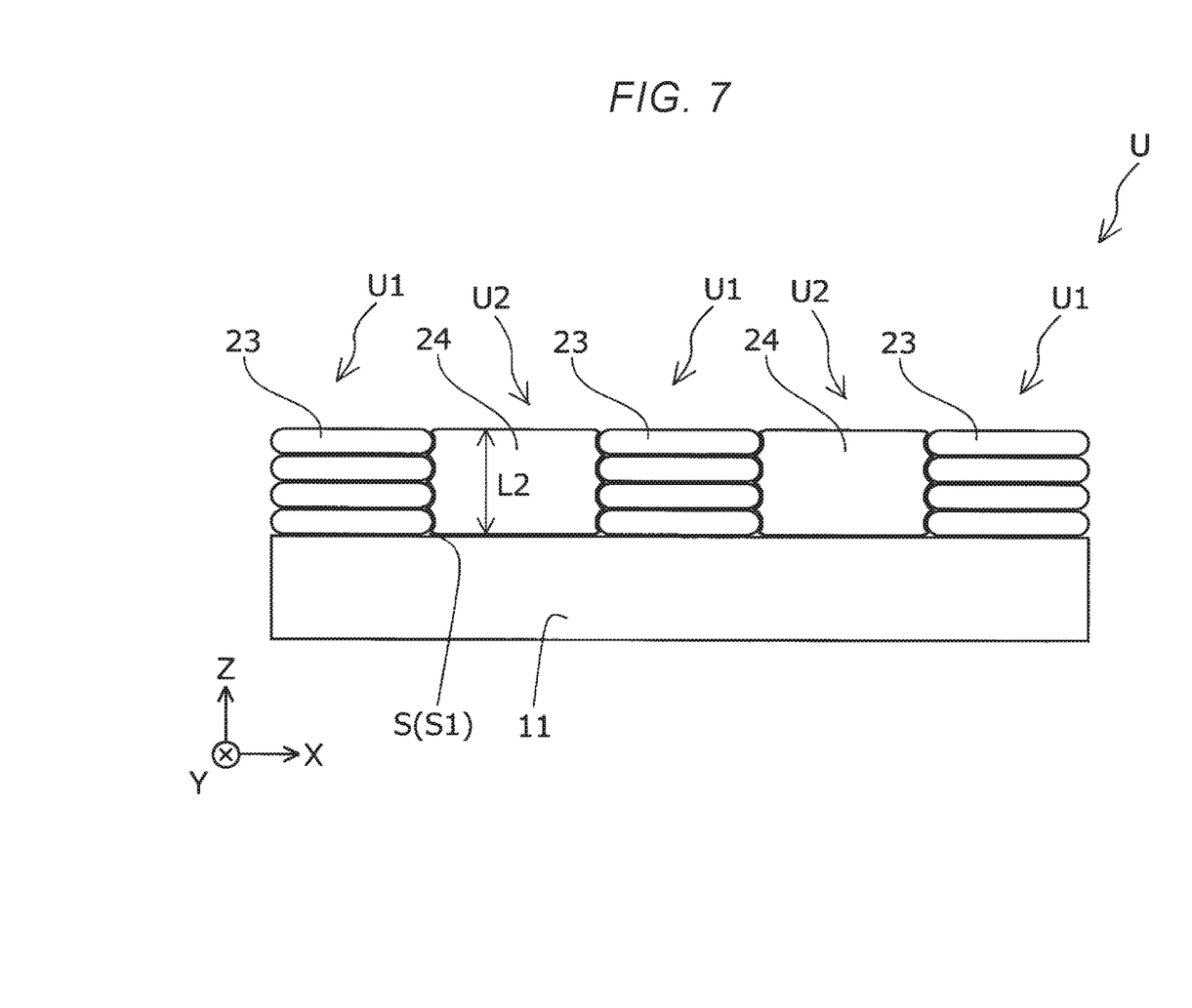
FIG. 7 is a schematic view for describing the state of the unit layer after the formation of the second unit layer in the manufacturing method of a three-dimensional object according to an embodiment of the present disclosure.

Next, based on the molding data input in the step S110, the second unit layer U2 formed of the second layer 24 having the second thickness L2 greater than the first thickness L1 is formed to adjoin the first unit layer U1 in the step S130. FIG. 7 shows a state in which the second unit layer U2 is formed after the formation of the first unit layer U1 by the present step S130.

Here, as described above, the end portions of the respective first layers 23 formed in the step S120 are more or less rounded. Since the end portions of the respective first layers 23 are more or less rounded, as shown in FIG. 6, the contact portions 23a with the second unit layer U2 in the first unit layer U1 are irregular. Since the contact portions 23a are irregular, the contactability of the second layer 24 with the contact portion 23a in the first layer 23 improves and, as shown in FIG. 7, and generation of the gap S that can be formed between the first unit layer U1 and the second unit layer U2 is suppressed.

Figure 9:
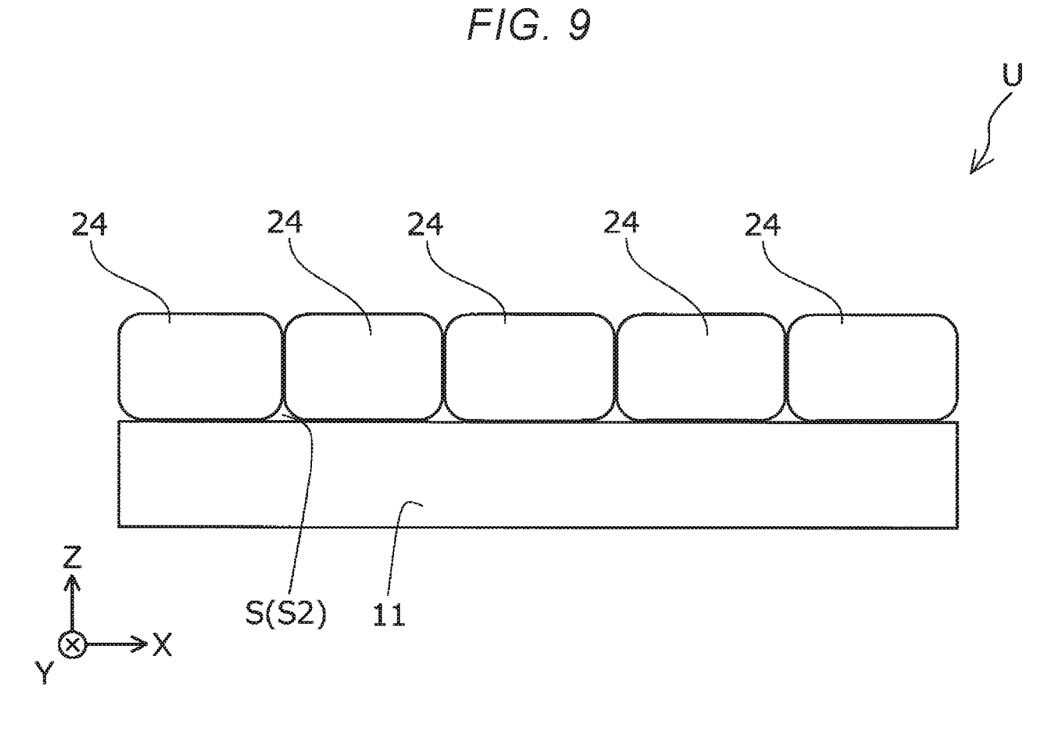
FIG. 9 is a schematic view for describing a unit layer in a manufacturing method of a three-dimensional object in the related art.

Here, FIG. 9 shows a state in which a unit layer U is formed by a manufacturing method of the three-dimensional object in the related art. Specifically, a state in which the unit layer U is formed of only the second layer 24 is shown. As is apparent from a comparison between FIGS. 7 and 9, a gap S1 in the unit layer U which is formed by the manufacturing method of the three-dimensional object of the present embodiment example is apparently smaller than a gap S2 in the unit layer U formed by the manufacturing method of the three-dimensional object in the related art.

Figure 8:
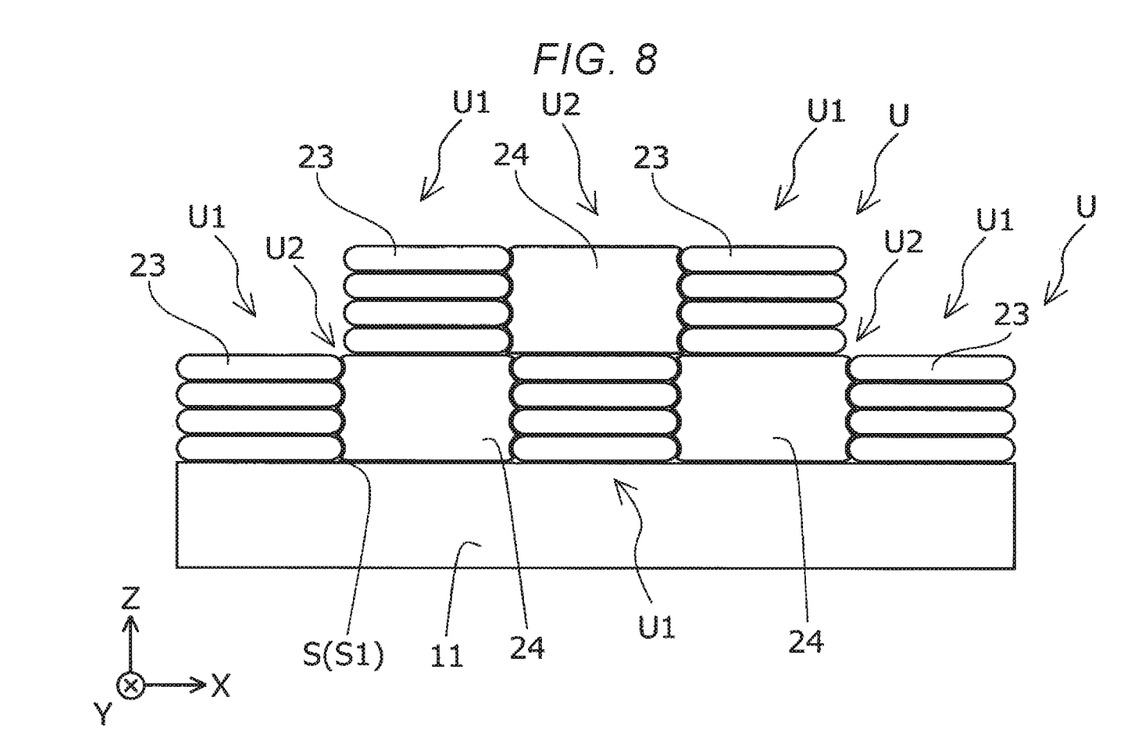
FIG. 8 is a schematic view for describing a three-dimensional object formed by a unit layer of two layers in the manufacturing method of the three-dimensional object according to an embodiment of the present disclosure.

Next, based on the molding data input in the step S110, it is determined in the step S140 whether the formation of the unit layer U, that is, the first unit layer U1 and the second unit layer U2, is over. When the formation of the unit layer U is determined not to be over, that is, when the unit layer U is determined to be further laminated, the process returns to the step S120 and the next unit layer U is formed. Here, FIG. 8 shows a state in which the unit layer U is determined to be further laminated in the step S140 after the unit layer U of the first layer is formed, the process returns to the step S120, and the unit layer U of the second layer is formed. FIG. 8 shows an example of the three-dimensional object configured with the unit layer U of two layers, and it goes without saying that the three-dimensional object manufactured by the manufacturing method of the three-dimensional object of the present embodiment example may be the three-dimensional object configured with the unit layer U of three or more layers. When the unit layer U of three or more layers is to be laminated, the steps S120 to S140 are repeated in accordance with the number of layers to be laminated.

On the other hand, when the formation of the unit layer U is determined to be over, the manufacturing method of the three-dimensional object of the present embodiment example ends. From the above description, the present step S140 corresponds to a determination step of determining the number of layers to be executed, based on the molding data input in the step S110, in the unit layer formation step of steps S120 and S130.

In the manufacturing method of the three-dimensional object of the present embodiment example, the unit layer U is formed with the inner diameter of the nozzle 10a being 200 μm, the first thickness L1 which is the thickness of the first layer 23 being 50 μm, and the second thickness L2 which is the thickness of the second layer 24 being 200 μm, but there is no particular limit to these values. Further, the line width of the first layer 23 ejected from the nozzle 10a is approximately 0.30 mm and the line width of the second layer 24 ejected from the nozzle 10a is approximately 0.38 mm. There is no particular limit to these values.

Here, to put it in a summary, the manufacturing method of the three-dimensional object of the present embodiment example is a manufacturing method of a three-dimensional object for manufacturing a three-dimensional object by laminating unit layers U using a fluid constituent material. The manufacturing method includes the unit layer formation step of forming the unit layer U of one layer by forming, by the step S120, the first unit layer U1 in which the plurality of the first layers 23 having the first thickness L1 are laminated and then forming, by the step S130, the second unit layer U2 formed of the second layer having the second thickness L2 greater than a first thickness L1 to adjoin a first unit layer U1, and it can be said that the unit layer formation step is executed a plurality of times to laminate the unit layer U.

As described above, in the manufacturing method of the three-dimensional object of the present embodiment example, a unit layer U of one layer is formed by the formation of the first unit layer U1 in which a plurality of thin first layers 23 are laminated and then the formation of the second unit layer U2, formed of the second layer 24 greater than the first thickness L1, to adjoin the first unit layer. Irregularities are formed in the contact portion 23a with the second unit layer U2 in the first unit layer U1 in which the plurality of first layers 23 are laminated, and the contactability of the contact portion 23a with the constituent material of the second unit layer U2 improves. Therefore, by causing the first unit layer U1 formed of a plurality of thin layers to adjoin the thick second unit layer U2, it is possible to suppress the gap S that can be generated by causing thick layers as shown in FIG. 9 to adjoin each other and to shorten the manufacturing time of the three-dimensional object as compared with the case in which the unit layer U is formed of thin layers only.

As described above, the manufacturing apparatus 1 of the three-dimensional object according to the present embodiment includes one ejection unit 21 ejecting a constituent material. That is, in the manufacturing method of the three-dimensional object of the present embodiment example, the constituent material of the first unit layer U1 and the constituent material of the second unit layer U2 are ejected from the same ejector 10 to form the unit layer U in the unit layer formation step. In this way, by the method of ejecting the constituent material of the first unit layer U1 and the constituent material of the second unit layer U2 from the same ejector 10 to form the unit layer U, it is possible to manufacture the three-dimensional object with the inexpensive manufacturing apparatus 1 of the three-dimensional object in a simple configuration, and a plurality of ejectors 10 are not required.

As shown in FIGS. 7 and 8, in the manufacturing method of the three-dimensional object of the present embodiment example, the outermost portion is composed of the first unit layer U1 in the respective laminated unit layers U. In other words, in the manufacturing method of the three-dimensional object of the present embodiment example, it is possible to dispose the first unit layer U1 in a portion constituting the surface of the three-dimensional object in the unit layer formation step of the steps S120 and S130. Therefore, it is possible to closely form the surface of the three-dimensional object with the thin first layer 23 and to enhance the density of the three-dimensional object. The outermost portion of the laminated body of the unit layer U shown in FIG. 8 is configured with the first unit layer U1 only in the direction intersecting with the lamination direction, which is the Z-direction, in which the unit layer U is laminated. However, it is particularly preferable that the outermost portion in the lamination direction of the unit layer U is also configured with the first unit layer U1. This is because the surface of the three-dimensional object in all directions can be closely formed.

The first unit layer U1 and the second unit layer U2 are configured to have the same thickness in FIG. 7 but may have different thicknesses. For example, it is possible to form the first unit layer U1 with the first layer 23 of five layers and to form the second unit layer U2 with the thin first layer 23 of the first unit layer U1 of four layers. In this case, the first unit layer U1 in the next unit layer U of one layer may be formed of three layers of the first layer 23, or the first unit layer U1 may be formed of the first layer 23 of four layers.

Further, in the manufacturing method of the three-dimensional object of the present embodiment example, it is possible to execute the unit layer formation step a plurality of times to laminate the unit layer U. Then, as shown in FIG. 8, in the manufacturing method of the three-dimensional object of the present embodiment example, it is possible to alternately arrange the first unit layer U1 and the second unit layer U2 in the lamination direction of the unit layer U in the unit layer formation step. Therefore, it is possible to execute the manufacturing method of the three-dimensional object of the present embodiment example to manufacture the three-dimensional object with no bias in composition. Further, in the first unit layer U1 and the second unit layer U2, a difference in shrinkage rate easily reveals itself when the thermoplastic resin, wax, or the like is degreased or metal particles are sintered. However, portions having a large shrinkage rate and portions having a small shrinkage rate are generated, and it is possible to suppress deformation of the three-dimensional object caused by the occurrence of a portion having a high shrinkage rate and a portion having a low shrinkage rate.

Further, as described above, the manufacturing apparatus 1 of the three-dimensional object according to the present embodiment includes a heater 9 in the ejector 10. Then, in the manufacturing method of the three-dimensional object of the present embodiment example, it is possible to change the temperature of the heater 9 at the time of forming the first unit layer U1 in the step S120 and at the time of forming the second unit layer U2 in the step S130. That is, as described above, in the unit layer formation step of the steps S120 and S130, the constituent material of the first unit layer U1 and the constituent material of the second unit layer U2 are ejected from the ejector 10 to form the unit layer U, and, in the unit layer formation steps, it is possible to raise the ejection temperature of the constituent material of the first unit layer U1 at the time of forming the first unit layer U1 higher than the ejection temperature of the constituent material of the second unit layer U2 at the time of forming the second unit layer U2.

It is possible to lower the viscosity by raising the ejection temperature. Therefore, by executing the manufacturing method of the three-dimensional object of the present embodiment example, it is possible to effectively suppress the generation of the gap S in the adjoining portions of the first unit layer U1 and the second unit layer U2 while making the constituent material of the first unit layer U1 and the constituent material of the second unit layer U2 the same.

In this way, in the unit layer formation step, it is possible to raise the viscosity of the constituent material of the first unit layer U1 at the time of forming the first unit layer U1 higher than the viscosity of the constituent material of the second unit layer U2 at the time of forming the second unit layer U2 and, by arranging the constituent materials of the second unit layer U2 having low viscosity and good contactability to adjoin the first unit layer U1, it is possible to effectively suppress the generation of the gap S in the adjoining portions of the first unit layer U1 and the second unit layer U2.

As described above, since the manufacturing apparatus 1 of the three-dimensional object according to the present embodiment includes one ejection unit 21 ejecting a constituent material, the first unit layer U1 and the second unit layer U2 share the common constituent material. However, the ejector 10 of the constituent material of the first unit layer U1 and the ejector 10 of the constituent material of the second unit layer U2 may be separately provided to differentiate the compositions of the constituent material of the first unit layer U1 and the constituent material of the second unit layer U2.

For example, by differentiating the constituent material of the first unit layer U1 and the constituent material of the second unit layer U2 to lower the viscosity of the constituent material of the second unit layer U2 below the viscosity of the constituent materials of the first unit layer U1, it is possible to use the manufacturing apparatus 1 of the three-dimensional object having a simple configuration in which the ejection temperature of the constituent material of the first unit layer U1 and the ejection temperature of the constituent material of the second unit layer U2 cannot be changed and to effectively suppress the generation of the gap S in the adjoining portions of the first unit layer U1 and the second unit layer U2.

The present disclosure is not limited to the embodiment examples described above and can be realized in various configurations within a range not deviating from the scope of the disclosure. The technical features in the embodiment examples corresponding to the technical features of the respective aspects described in the summary can be appropriately replaced or combined in order to resolve some or all of the problems described above or to achieve some or all of the effects described above. Further, the technical features can be appropriately removed as long as the technical features are not described as indispensable in the present specification.

What is claimed is:

1. A method for manufacturing a three-dimensional object, the method comprising;
   forming a plurality of first unit layers on a plate, each first unit layer of the plurality of first unit layers being configured with a plurality of first layers that are stacked on each other in a first direction, each first layer of the plurality of first layers having a first thickness along the first direction, two adjacent unit layers of the plurality of first unit layers being spaced apart from each other via a space;
   forming a plurality of second unit layers in the spaces between the two adjacent unit layers of the plurality of first unit layers so as to form a first group of unit layers on the plate, each second unit layer of the plurality of second unit layers being configured by a single second layer, the single second layer having a second thickness in the first direction; and
   repeating the formation of the plurality of first unit layers and the formation of the plurality of second unit layers a plurality of times on a previously formed group of unit layers,
   wherein the second thickness is larger than the first thickness, and
   a first height in the first direction of each first unit layer of the plurality of first unit layers is equal to a second height in the first direction of each second unit layer of the plurality of second unit layers.

2. The method according to claim 1,
wherein a first material for forming each first unit layer of the plurality of first unit layers is ejected from a ejector, and
a second material for forming each second unit layer of the plurality of second unit layers is ejected from the ejector.

3. The method according to claim 1,
wherein an outer most layer of the three-dimensional object is formed with only the plurality of first unit layers.

4. The method according to claim 1,
wherein, when a first material for forming each first unit layer of the plurality of first unit layers is ejected from an ejector, the first material has a first viscosity, and
when a second material for forming each second unit layer of the plurality of second unit layers is ejected from the ejector, the second material has a second viscosity that is smaller than the first viscosity.

5. The method according to claim 4,
wherein, when the plurality of first unit layers are formed, the first material is heated by a heater at a first temperature, and
when the plurality of second unit layers are formed, the second material is heated by the heater at a second temperature that is higher than the first temperature.

6. The method according to claim 4,
wherein the first material and the second material are different from each other.

7. The method according to claim 1,
wherein after the first group of unit layers is formed, a second group of unit layer is formed on the first group of unit layers, and the second group of unit layer is stacked on the first group of unit layers in the first direction,
every first unit layer of the plurality of first unit layers in the second group of unit layers is formed on every second unit layer of the plurality of second unit layers in the first group of unit layers, and
every second unit layer of the plurality of second unit layers in the second group of unit layers is formed on every first unit layer of the plurality of first unit layers in the first group of unit layers.

* * * * *